(12) United States Patent
Macko et al.

(10) Patent No.: US 11,919,617 B2
(45) Date of Patent: Mar. 5, 2024

(54) CIRCUMFERENTIAL LAP SPLICES FOR SECTIONS OF FUSELAGE

(71) Applicant: The Boeing Company, Chicago, IL (US)

(72) Inventors: Patrick J. Macko, Mount Pleasant, SC (US); Byron James Autry, Charleston, SC (US); James R. Kendall, Mount Pleasant, SC (US); Samuel James Knutson, Charleston, SC (US); Brian T. Peters, Mount Pleasant, SC (US); Michael J. Bailey, Summerville, SC (US); Matthew S. Stauffer, Summerville, SC (US); Steven Wanthal, Summerville, SC (US); Santiago M. Mejia, Charleston, SC (US); Sara Murphy, Madison, AL (US)

(73) Assignee: The Boeing Company, Chicago, IL (US)

( * ) Notice: Subject to any disclaimer, the term of this patent is extended or adjusted under 35 U.S.C. 154(b) by 157 days.

(21) Appl. No.: 17/480,880

(22) Filed: Sep. 21, 2021

(65) Prior Publication Data

US 2022/0194547 A1 Jun. 23, 2022

Related U.S. Application Data

(60) Provisional application No. 63/127,004, filed on Dec. 17, 2020.

(51) Int. Cl.
*B64C 1/06* (2006.01)
*B64C 1/12* (2006.01)
*B64F 5/10* (2017.01)

(52) U.S. Cl.
CPC ............... *B64C 1/069* (2013.01); *B64C 1/12* (2013.01); *B64F 5/10* (2017.01)

(58) Field of Classification Search
CPC ........................ B64C 1/069; B64C 2001/0072
See application file for complete search history.

(56) References Cited

U.S. PATENT DOCUMENTS

| 8,960,606 B2 * | 2/2015 | Diep | B64C 1/12 244/131 |
| 2006/0060705 A1 | 3/2006 | Stulc et al. | |
| 2012/0104170 A1 * | 5/2012 | Gallant | B64C 1/12 244/132 |

FOREIGN PATENT DOCUMENTS

| EP | 2662281 A2 | 11/2013 |
| EP | 3293105 A1 | 3/2018 |

(Continued)

OTHER PUBLICATIONS

European Search Report; Application EP21201146; dated Mar. 7, 2022.

(Continued)

*Primary Examiner* — Philip J Bonzell
*Assistant Examiner* — Eric Acosta
(74) *Attorney, Agent, or Firm* — Duft & Bornsen, PC

(57) ABSTRACT

Systems and methods are provided for splicing airframe components. One embodiment is a method for assembling an airframe of an aircraft. The method includes forming a first skin of a first circumferential section of fuselage, the first skin including a distal portion comprising a lip and a shoulder, aligning a second skin of a second circumferential section of fuselage with the shoulder such that the lip overlaps the second skin, and affixing the first skin and the second skin together via a circumferential splice.

20 Claims, 18 Drawing Sheets

(56) References Cited

FOREIGN PATENT DOCUMENTS

| EP | 3521162 A1 * | 8/2019 | ............... B32B 3/06 |
|----|----|----|----|
| EP | 3521162 A1 | 8/2019 | |
| FR | 2622257 A1 | 4/1989 | |
| WO | 2009103635 A1 | 8/2009 | |

OTHER PUBLICATIONS

U.S. Appl. No. 16/798,187.
EP Office Action, Application 21201146.4, dated May 10, 2023.

\* cited by examiner

CIRCUMFERENTIAL LAP SPLICES FOR SECTIONS OF FUSELAGE

RELATED APPLICATIONS

This non-provisional patent application claims priority to U.S. Provisional Patent Application No. 63/127,004, filed on Dec. 17, 2020.

FIELD

The disclosure relates to the field of assembly, and in particular, to assembly of airframes for aircraft.

BACKGROUND

An airframe defines the mechanical structure of an aircraft. Airframes are made of multiple components that provide desired structural properties for aircraft. For example, a portion of an airframe for a fuselage of an aircraft may include frames, skin, and stringers that are mechanically coupled together (e.g., via co-bonding, co-curing, or fasteners) in accordance with design parameters. As presently practiced, sections of fuselage may be fabricated as full-barrel sections, and these full-barrel sections may be joined via circumferential splices. However, circumferential splicing involves the addition of splice straps and numerous affixation components around the entire circumference of the fuselage sections being joined. Hence, circumferential splices add substantial amounts of weight to an aircraft, and considerable amounts of labor are involved in the installation of circumferential splices, particularly with regard to aligning the splice strap with other affixation components.

Therefore, it would be desirable to have a method and apparatus that take into account at least some of the issues discussed above, as well as other possible issues.

SUMMARY

Embodiments described herein provide for fuselage sections having skins that are dimensioned to mate with each other (e.g., via a shiplap join, rabbet, or other feature). These complementary sections of skin enhance the strength of circumferential splices between barrel sections of fuselage, and also may eliminate the need for splice straps. This may reduce the amount of added weight involved in each circumferential splice, and may additionally reduce the complexity of aligning and assembling each circumferential splice. Thus, the embodiments provided herein result in technical benefits in the form of increased (or equal) amounts of strength compared to other joins, reduced weight, and reduced labor.

One embodiment is a method for assembling an airframe of an aircraft. The method includes forming a first skin of a first circumferential section of fuselage. The first skin includes a distal portion comprising a lip and a shoulder. The method further includes aligning a second skin of a second circumferential section of fuselage with the shoulder such that the lip overlaps the second skin, and still further includes affixing the first skin and the second skin together via a circumferential splice.

A further embodiment is a system comprising a portion of an airframe of an aircraft. The system includes a first skin of a first circumferential section of fuselage, which includes a distal portion comprising a lip and a shoulder. The system also includes a second skin of a second circumferential section of fuselage that is aligned with the shoulder, such that the lip overlaps the second skin, and still further includes a circumferential splice that affixes the first skin and the second skin together.

A further embodiment is a system comprising a circumferential splice. The circumferential splice includes a splice fitting that straddles a lap join between a first skin of a first circumferential section of an aircraft and a second skin of a second circumferential section of the aircraft, a filler disposed at the second circumferential section that contacts a first portion of a base of the splice fitting, and a flange of a stringer at the first circumferential section that contacts a second portion of the base of the splice fitting. The flange and the filler together define a flat plane for receiving the splice fitting.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Many or all of the components discussed herein may be implemented as composite parts. Composite parts, such as Carbon Fiber Reinforced Polymer (CFRP) parts, are initially laid-up in multiple layers that together are referred to as a preform. Individual fibers within each layer of the preform may be aligned parallel with each other, but different layers exhibit different fiber orientations in order to increase the strength of the resulting composite part along different dimensions. Furthermore, some layers may comprise woven fabric made from fibers. The preform includes a viscous resin that solidifies in order to harden the preform into a composite part (e.g., for use in an aircraft). Carbon fiber that has been impregnated with an uncured thermoset resin or a thermoplastic resin is referred to as "prepreg." Other types of carbon fiber include "dry fiber" which has not been impregnated with thermoset resin but may include a tackifier or binder. Dry fiber is infused with resin prior to hardening. For thermoset resins, the hardening is a one-way process referred to as curing, while for thermoplastic resins, the resin reaches a viscous form if it is re-heated, after which it can be consolidated to a desired shape and solidified. As used herein, the umbrella term for the process of transitioning a preform to a final hardened shape (i.e., transitioning a preform into a composite part) is referred to as "hardening," and this term encompasses both the curing of thermoset preforms and the forming/solidifying of thermoplastic preforms into a final desired shape.

Figure 1:
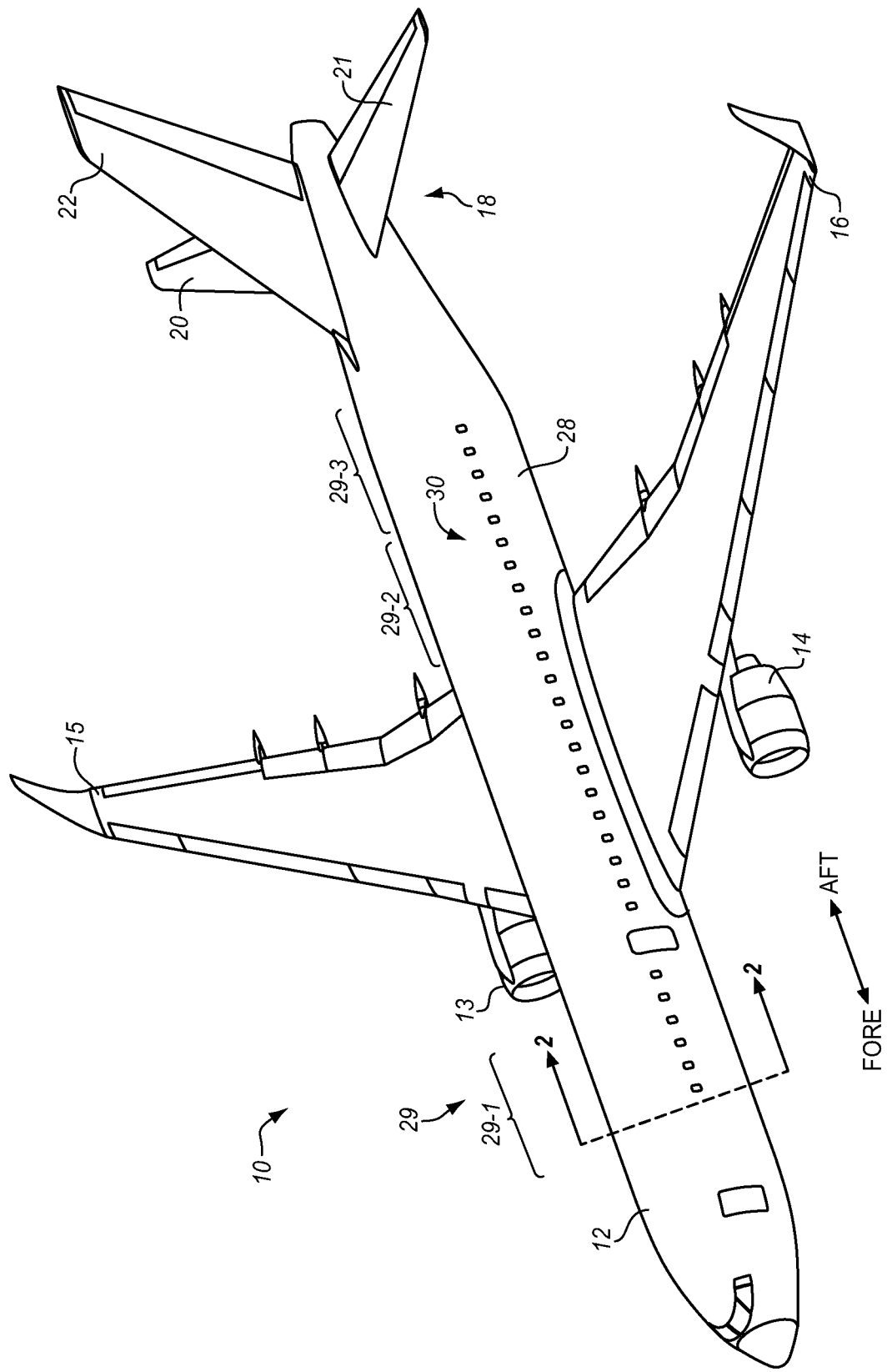
FIG. 1 illustrates an aircraft in an illustrative embodiment.

Turning now to FIG. 1, an illustration of an aircraft 10 is depicted for which the fabrication systems and methods described herein may be implemented. In this illustrative example, aircraft 10 includes wing 15 and wing 16 attached to fuselage 28 having a nose 12. Aircraft 10 includes engine 13 attached to wing 15 and engine 14 attached to wing 16. Tail section 18 is also attached to fuselage 28. Horizontal stabilizer 20, horizontal stabilizer 21, and vertical stabilizer 22 are attached to tail section 18 of fuselage 28. The fuselage 28 itself is formed from multiple barrel sections 29-1, 29-2, and 29-3 (referred to generally as "barrel sections 29"). The barrel sections 29 have been joined together and define a circumference 30 of the fuselage 28. In this embodiment, three different instances of barrel sections 29 are labeled, but any suitable number of barrel sections 29 may be utilized to form the fuselage 28 as a matter of design choice.

Figure 2:
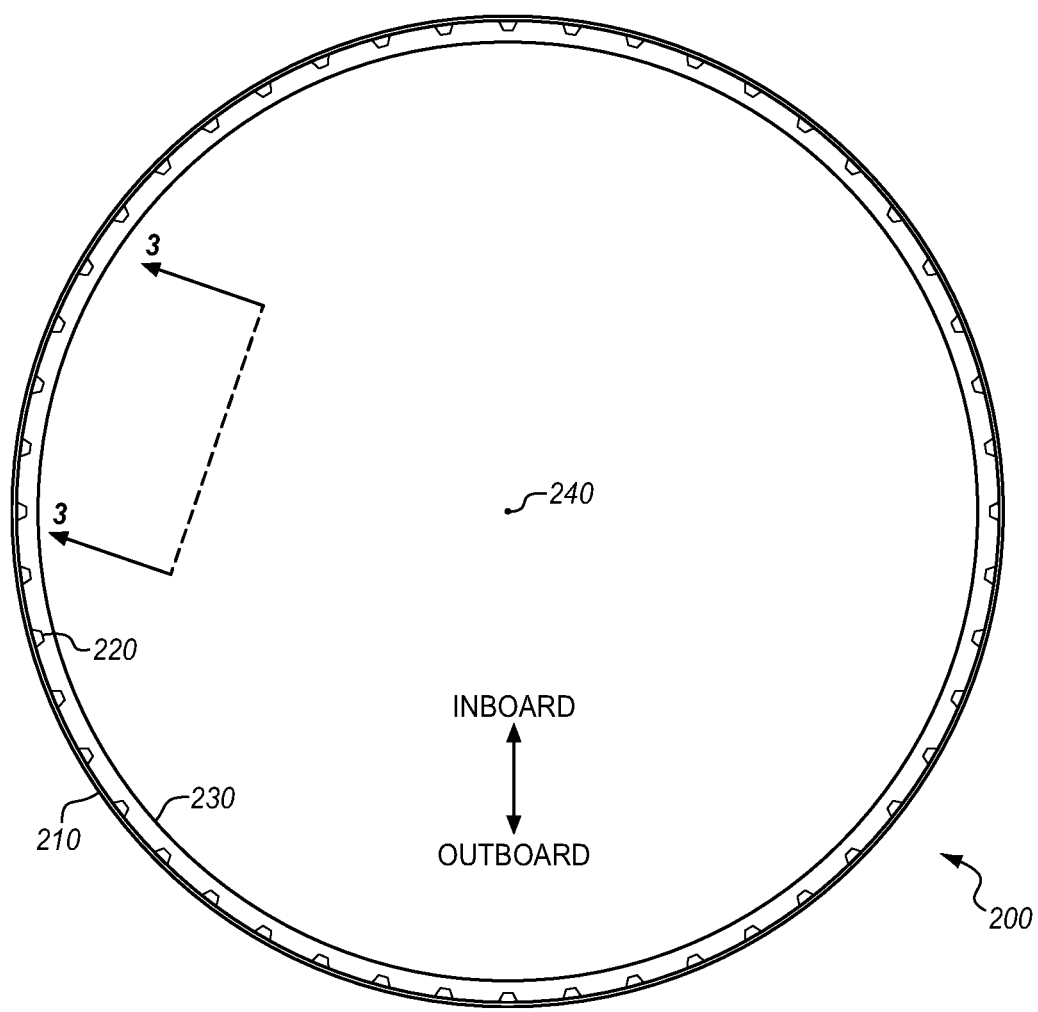
FIG. 2 depicts a cross section of a circumferential section of fuselage of the aircraft of FIG. 1 in an illustrative embodiment.

FIG. 2 depicts a cross section of a first circumferential section 200 (e.g., a barrel section 29, a section forming a ninety-degree arc, or other curved section) of fuselage 28 of the aircraft 10 of FIG. 1 in an illustrative embodiment. First circumferential section 200 is referred to as "circumferential" because it forms a part of the circumference 30 of fuselage 28. First circumferential section 200 may thus comprise one of barrel sections 29 of FIG. 1.

As shown in FIG. 2, first circumferential section 200 comprises a first skin 210, to which stringers 220 and frames 230 are attached. In this embodiment, first circumferential section 200 is circular, having a center 240.

Figure 3:
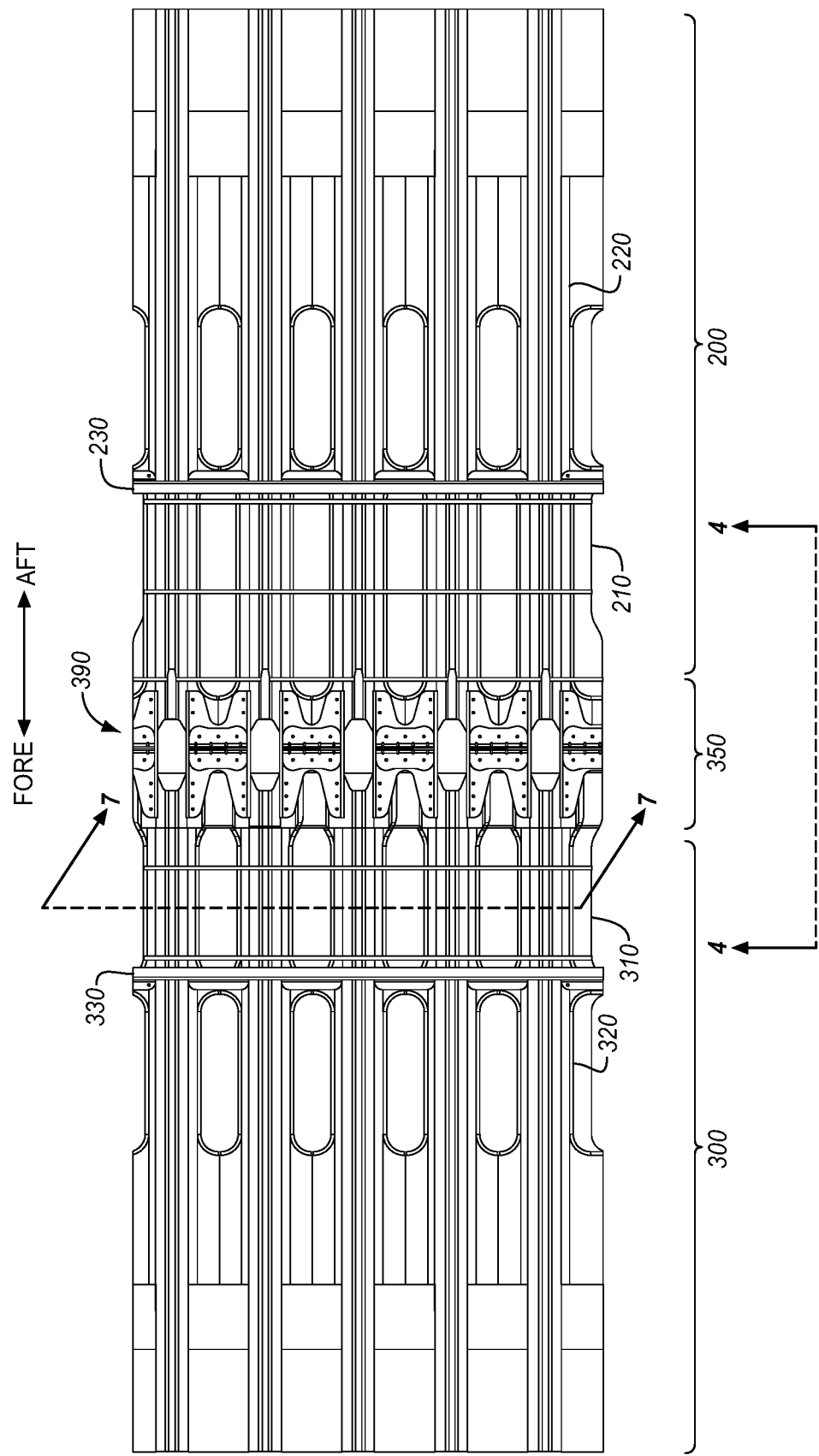
FIG. 3 is an interior view of a circumferential splice between circumferential sections of fuselage in an illustrative embodiment.

FIG. 3 is an interior view of a circumferential splice 390 between circumferential sections of fuselage in an illustrative embodiment, and corresponds with view arrows 3 of FIG. 2. The circumferential splice 390 extends around the entirety of the first circumferential section 200 (e.g., barrel section 29-2), however, only a portion of the circumferential splice 390 is shown in this view. As shown in FIG. 3, the circumferential splice 390 is between a first circumferential section 200 (including first skin 210, stringers 220, and frames 230) and a second circumferential section 300 (including second skin 310, stringers 320, and frames 330). At the circumferential splice 390, the first circumferential section 200 and the second circumferential section 300 (e.g., barrel section 29-3) are coupled together via a lap join 350. The first circumferential section 200 includes a first skin 210 and stringers 220, while the second circumferential section 300 includes a second skin 310 and stringers 320. The lap join 350 includes a variety of components that affix the first circumferential section 200 to the second circumferential section 300, as discussed below with regard to the following FIGS. Depending on embodiment, these various components may be affixed via fastening, co-curing, or co-bonding.

Figure 4:
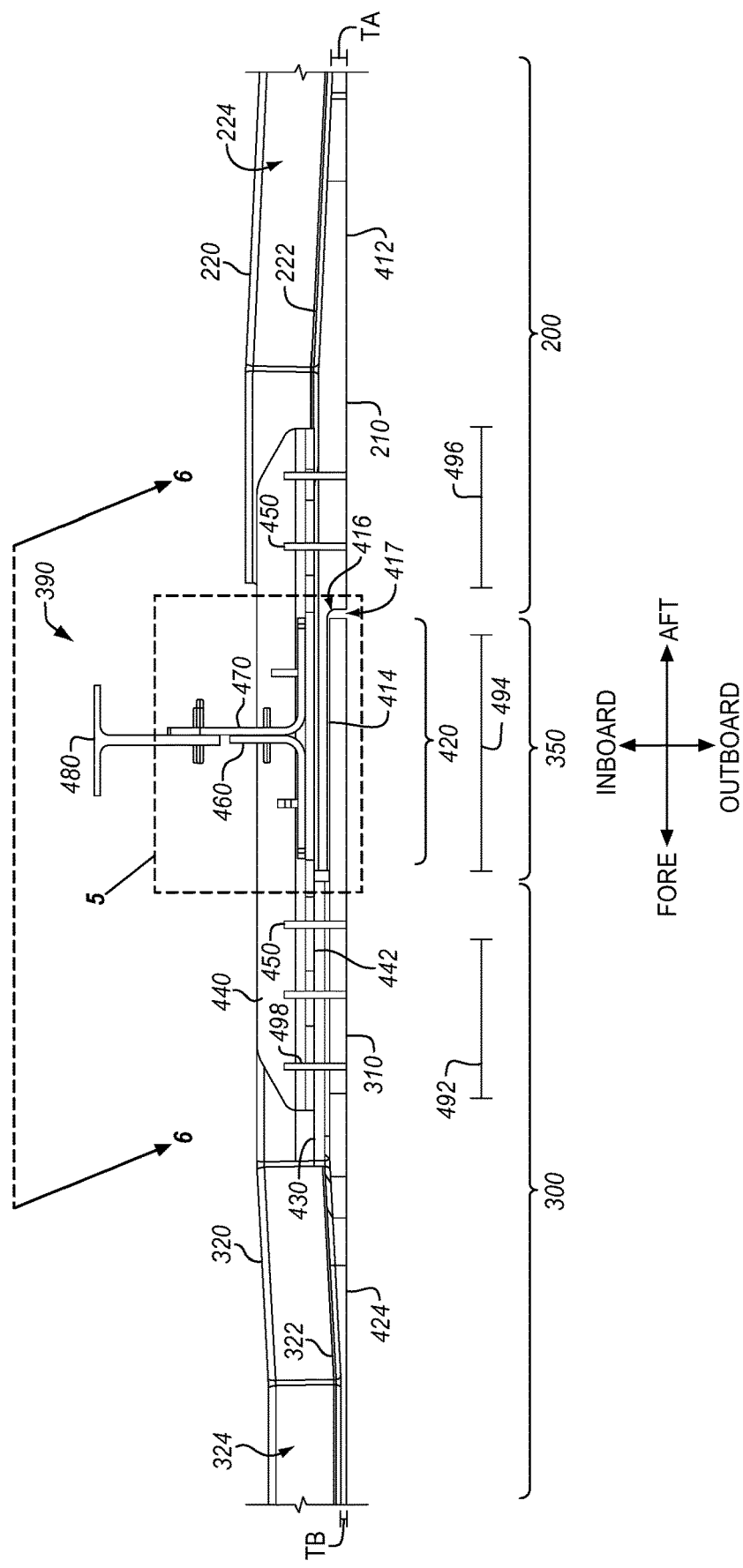
FIG. 4 is side view of a circumferential splice in an illustrative embodiment.

FIG. 4 is side view of the circumferential splice 390 in an illustrative embodiment, and corresponds with view arrows 4 of FIG. 3. As shown in FIG. 4, the circumferential splice 390 includes a number of interconnected components. Starting generally from the bottom of FIG. 4 and moving upwards (i.e., proceeding from outboard to inboard), the circumferential splice 390 includes second skin 310, which forms a lap join 350 (e.g., a ship lap join, rabbet join, etc.) with first skin 210. Specifically, second skin 310 is disposed overtop a lip 414 of first skin 210, and is indexed relative to shoulder 416 of first skin 210 via Determinant Assembly (DA) holes 498, leaving a gap 417 for aerosealing. In one embodiment, DA holes 498 are implemented as pilot holes that are aligned at a top, left, and right of the first skin 210 and the second skin 310. When the pilot holes are aligned with respect to the skins, the skins are known to be in a desired alignment.

The lip 414 and the shoulder 416 are disposed at a distal portion 420 of the first skin 210. Proximate to or at the circumferential splice 390, a thickness (TB) of second skin 310 increases at ramp 424, and a thickness (TA) of first skin 210 increases at ramp 412. This increases the strength of the lap join 350. In this embodiment, TB is less than TA after the ramps have fully increased the thickness of the first skin 210 and the second skin 310. This leaves sufficient material for lip 414 to remain after the first skin 210 is machined.

Stringer 320, having flanges 322 and a body 324, is disposed atop second skin 310, while stringer 220, having flanges 222 and a body 224, is disposed atop first skin 210. Flanges 222 extend along the lip 414 towards the second skin 310. A filler 430 is disposed atop a flange 322 of the stringer 320. A splice fitting 440 (e.g., an H-fitting, L-bracket, T-bracket, or other) rests partially atop the filler 430, and partially atop the flange 222. The splice fitting 440 is affixed via fasteners 450, and a lowboy 460 and shear tie splice 470 protrude upward from the splice fitting 440. Specifically, in location 492, the fasteners 450 are driven from outboard to inboard through second skin 310, flange 322, filler 430, and splice fitting 440. In location 494, the fasteners 450 are driven from outboard to inboard through second skin 310, an optional shim (e.g., shim 510 of FIG. 5), lip 414, flange 222, and splice fitting 440. In location 496, the fasteners 450 are driven from outboard to inboard through first skin 210, flange 222, and splice fitting 440.

A frame 480 (e.g., a composite or titanium frame) has been added to this FIG., and is affixed to the shear tie splice 470. While the shear tie splice 470 is illustrated as being centered over the lap join 350, in further embodiments the shear tie splice 470 is disposed to the left or the right of the lap join 350. In still further embodiments, stringer 320 or stringer 220 may extend fore or aft beyond the lap join 350.

Utilizing the arrangement of FIG. 4, there is no need for a splice strap. Hence, a technical benefit is provided because the labor associated with aligning a splice strap is saved, and weight at the circumferential splice 390 may therefore be reduced because fewer components are used.

Figure 5:
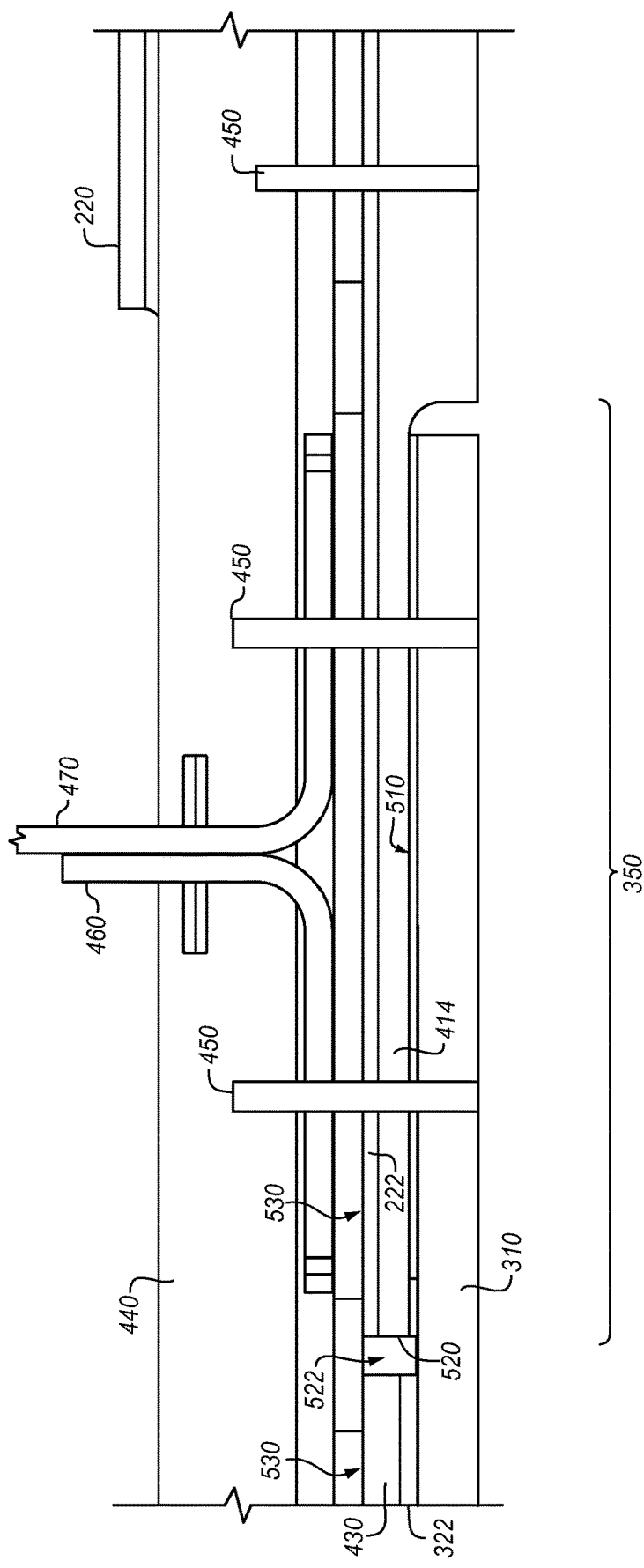
FIG. 5 is a zoomed in view of the portion of the circumferential splice of FIG. 8 in an illustrative embodiment.

Further details of the circumferential splice 390 are provided with respect to FIG. 5, which is a zoomed in view of the lap join 350 of FIG. 4 in an illustrative embodiment. Specifically, FIG. 5 corresponds with region 5 of FIG. 4. In FIG. 5, the filler 430 and an end 520 of the lip 414 are separated by a gap 522. However, in many embodiments the filler 430 is butted against the end 520 of the lip 414.

In this embodiment, an optional shim 510 has been included between the lip 414 and the second skin 310. The combined thickness of the flange 322 and filler 430 is equal to a combined thickness of the shim 510, lip 414, and flange 222. This results in a flat plane 530 for receiving the splice fitting 440. The shim 510 is not a splice strap because it is not a structural component of the circumferential splice 390, and also because the shim 510 does not form a single strap joint across two butted sections of skin.

Figure 6:
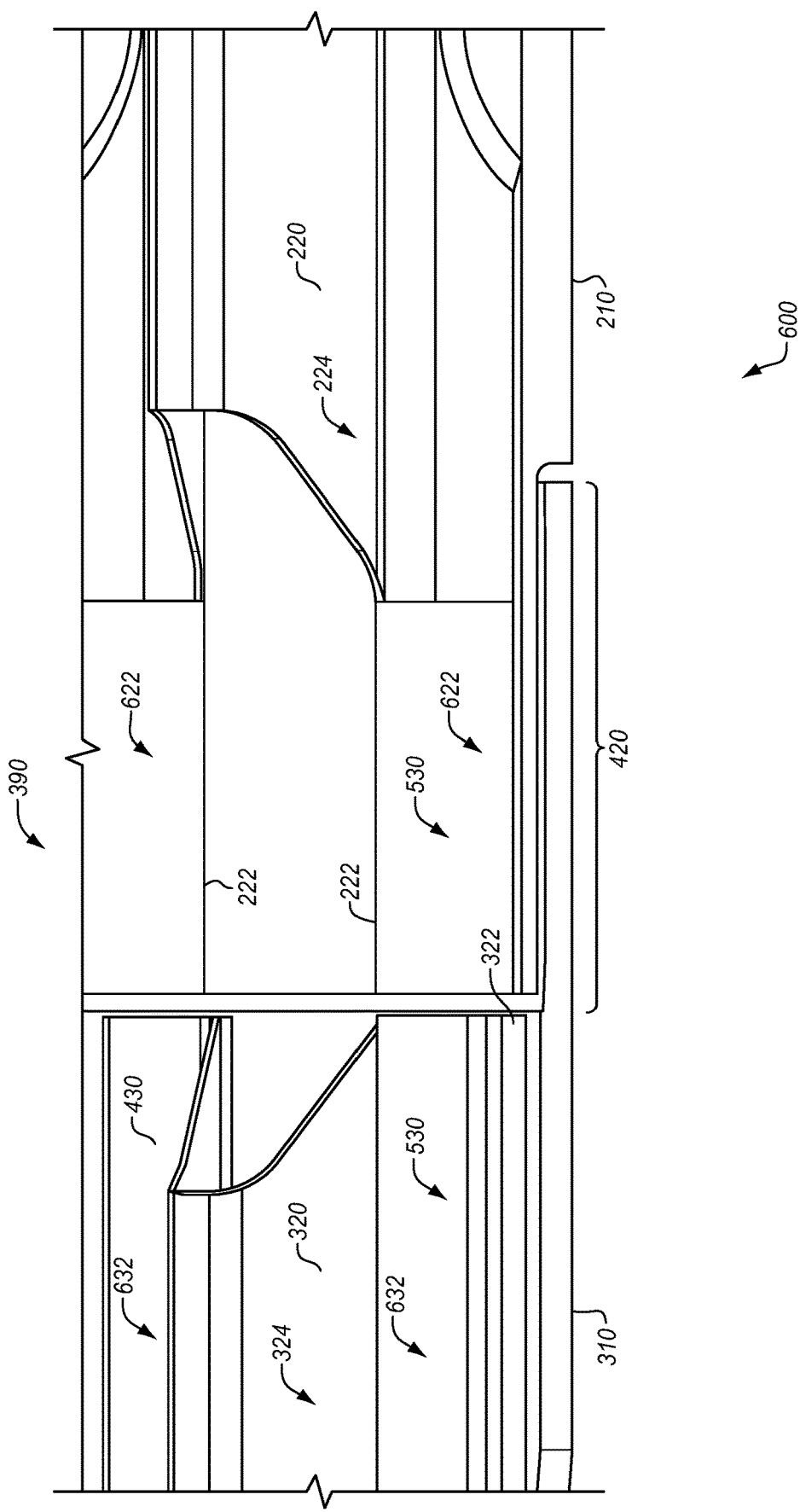
FIG. 6 is a perspective view of stringers that cover a portion of a circumferential splice in an illustrative embodiment.

FIG. 6 is a perspective view of stringers 220 and 320 that cover a portion 600 of a circumferential splice 390 in an illustrative embodiment, and corresponds with view arrows 6 of FIG. 4. In FIG. 6, flanges 222 of stringer 220 extend beyond a body 224 of the stringer 220 and across the lap join 350 along lip 414. Meanwhile, flanges 322 of stringer 320 are covered by fillers 430. The top surfaces 622 of the flanges 222, and the top surfaces 632 of the fillers 430, are coplanar with each other and define flat plane 530 of FIG. 5, enabling the splice fitting 440 to straddle these components when installed. The orientation of flat planes 530 along the circumference 30 of the fuselage 28 varies as the circumference 30 is traversed, to accommodate the local geometry of the circumference 30 (i.e., the curvature of the circumference 30).

Figure 7:
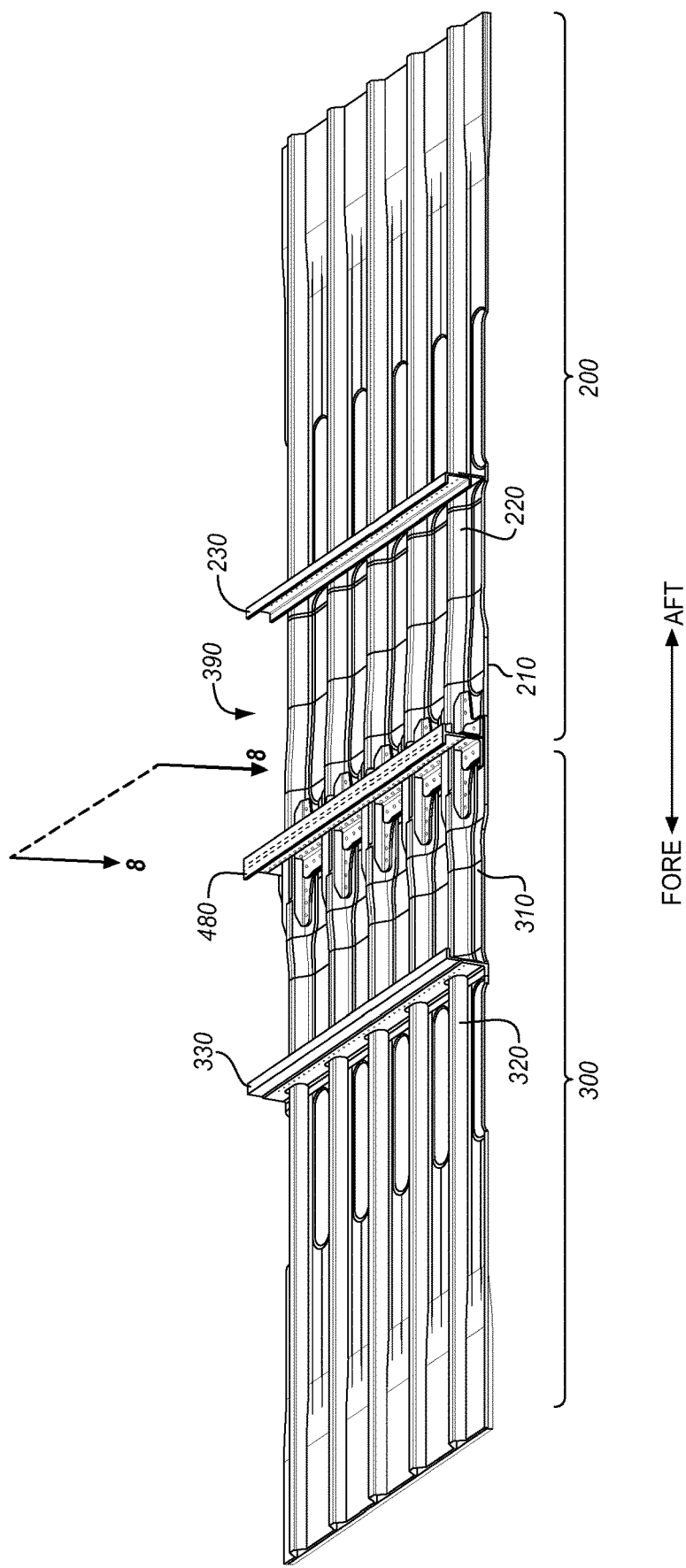
FIG. 7 is a further view of the circumferential splice of FIG. 3 in an illustrative embodiment.

FIG. 7 is a further view of the circumferential splice 390 of FIG. 3 in an illustrative embodiment, and corresponds with view arrows 7 of FIG. 3. Specifically, FIG. 7 provides a different viewing angle of the circumferential splice 390, and additionally depicts a frame 480 affixed to the circumferential splice 390.

Figure 8:
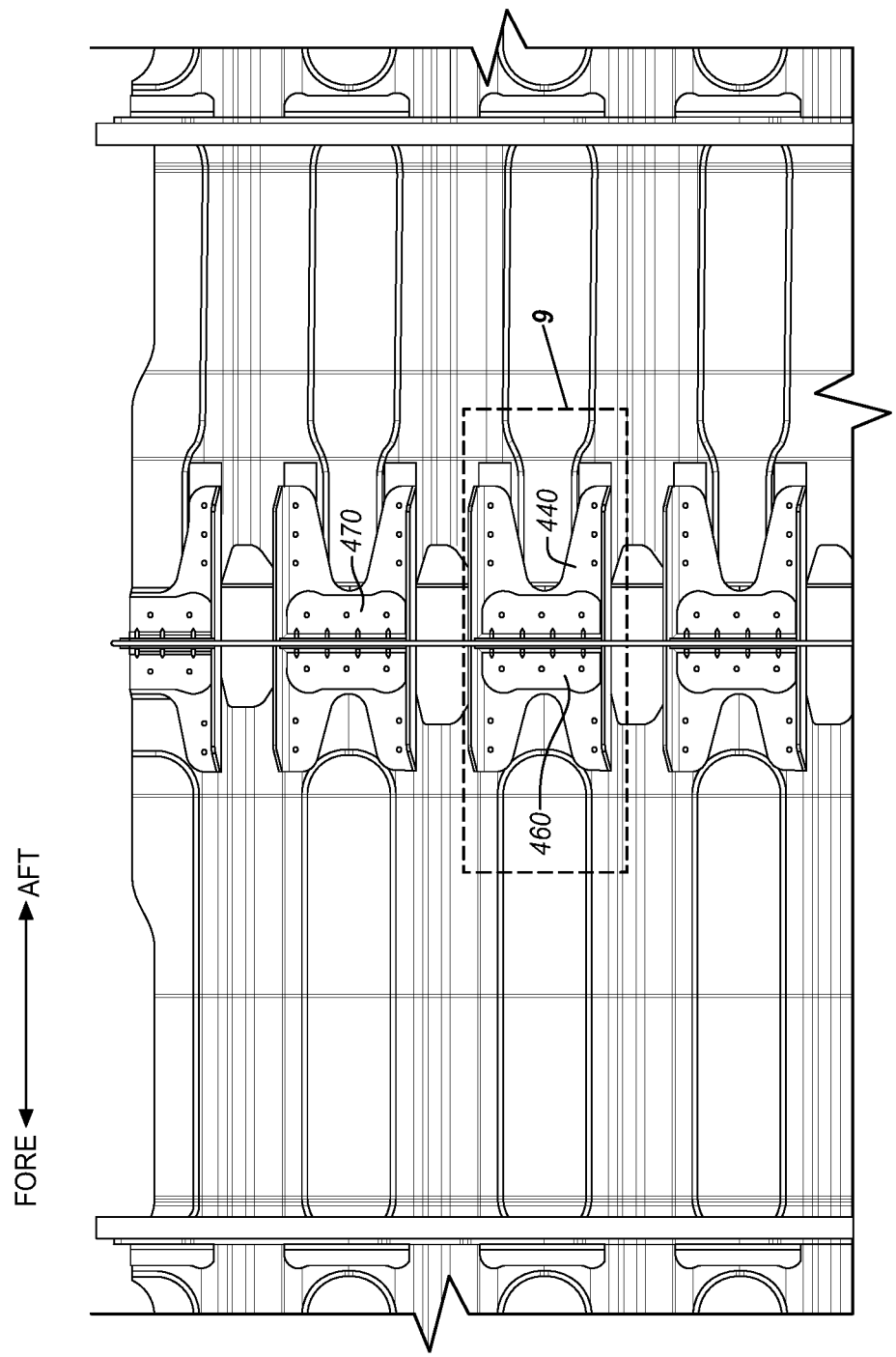
FIG. 8 is a zoomed in view of the circumferential splice of FIG. 3 in an illustrative embodiment.
Figure 9:
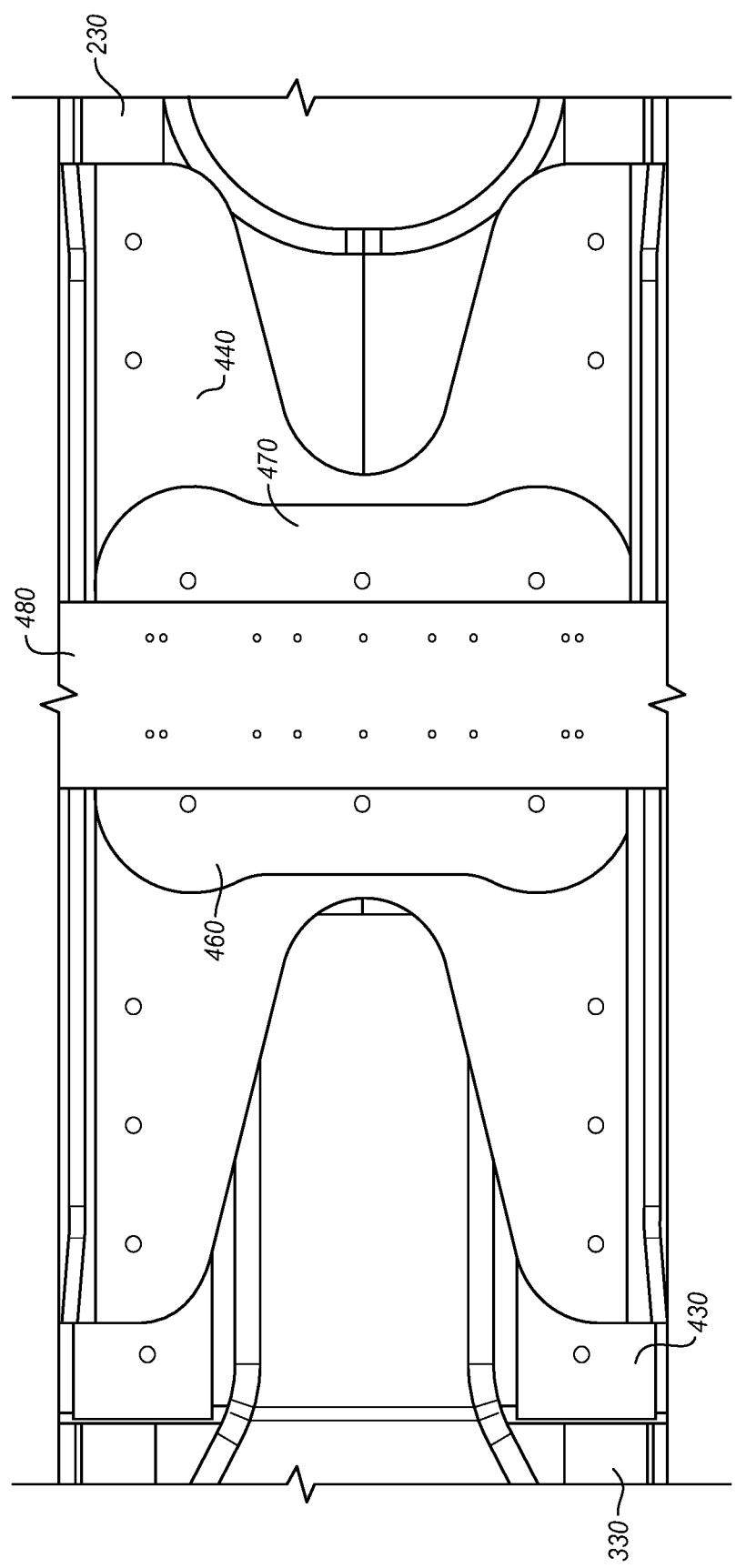
FIG. 9 is a zoomed in view of a splice fitting that forms a portion of a circumferential splice in an illustrative embodiment.
Figure 10:
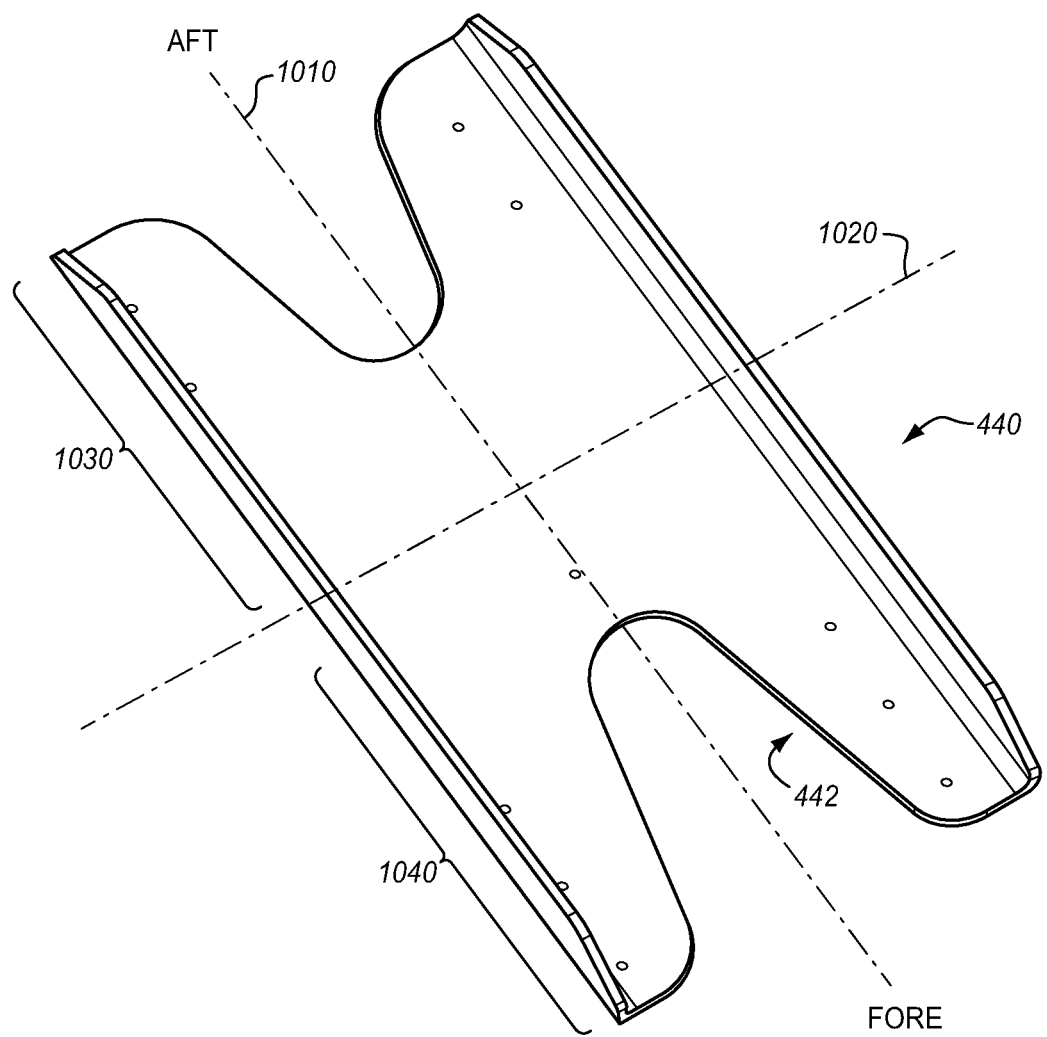
FIG. 10 is a perspective view of a splice fitting in an illustrative embodiment.

FIGS. 8-10 are additional views that provide additional context pertaining to the components recited above. FIG. 8 is a zoomed in view of the circumferential splice 390 of FIG. 3 in an illustrative embodiment, and corresponds with view arrows 8 of FIG. 7. Specifically, FIG. 8 provides context by depicting splice fitting 440, lowboy 460, and shear tie splice 470 from a new viewing angle. In this view, frame 480 has been omitted. FIG. 9 is a zoomed in view of a splice fitting 440 that forms a portion of a circumferential splice 390 in an illustrative embodiment, and corresponds with region 9 of FIG. 8. In this view, frame 480 has been included, and frame 480 overlaps splice fitting 440, lowboy 460, and shear tie splice 470.

FIG. 10 is a perspective view of a splice fitting 440 in an illustrative embodiment. FIG. 10 makes clear that splice fitting 440 is symmetrical about line 1010, but is asymmetrical about line 1020 (i.e., from fore to aft). Specifically, a first portion 1030 of a base 442 (e.g., an underside) of the splice fitting 440 rests on the filler 430, and is shaped differently than a second portion 1040 of the base 442 that rests on or otherwise contacts a flange 222 of the stringer 220. This difference in shape from fore to aft accommodates placement of the splice fitting onto the filler 430 (e.g., on the aftward side) as well as the flanges 222 of stringer 220 (e.g., on the forward side). It will be understood that a completed circumferential splice 390 will include splice fittings 440 along the entirety of the circumference 30 of the fuselage 28, in order to straddle the lap join 350 and enhance strength.

With a discussion of the overall shape of the circumferential splice 390 provided with regard to FIGS. 1-10, further discussion focuses on ply sequencing stackups for the first skin 210, and method for fabricating the circumferential splices 390 discussed herein.

Figure 11:
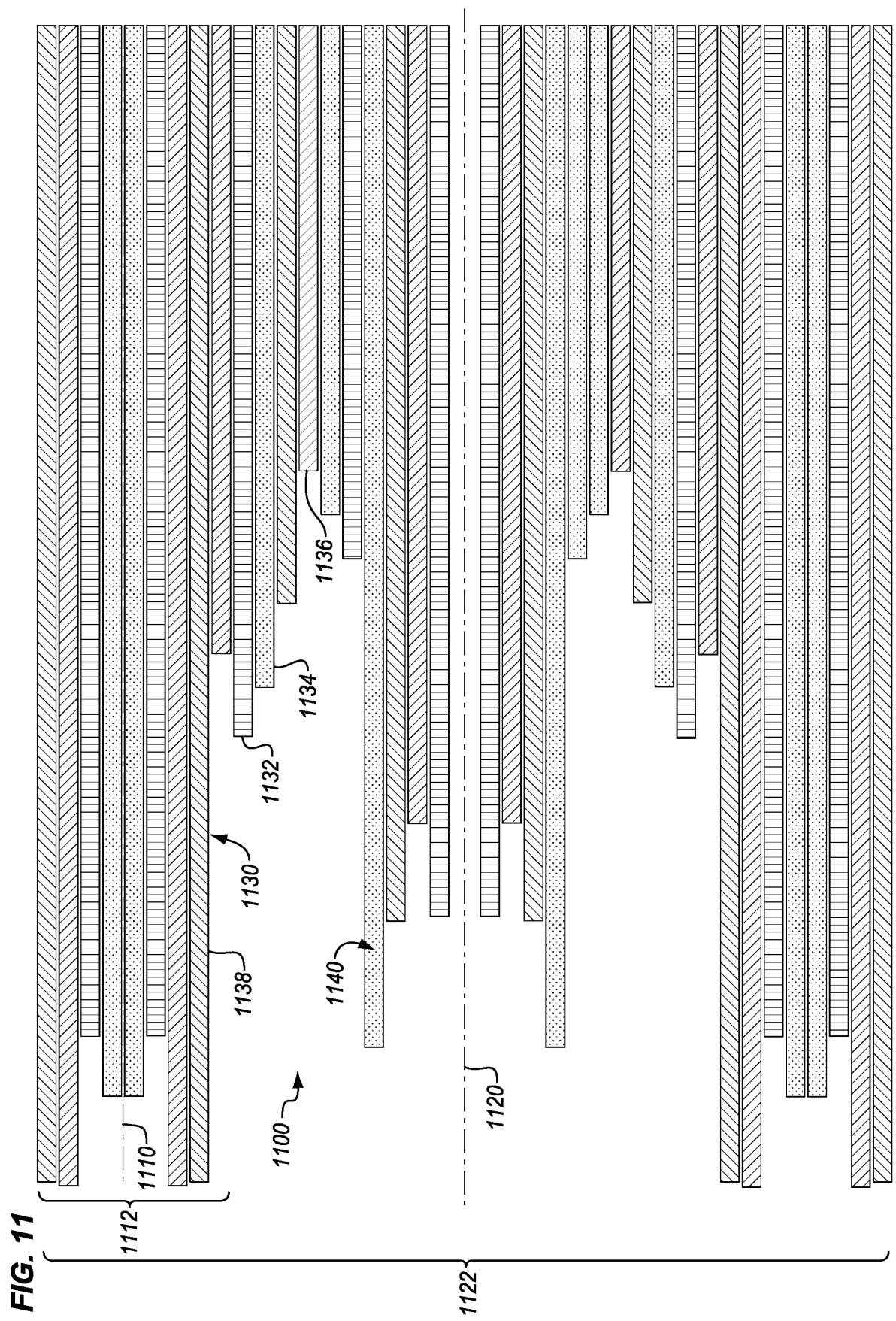
FIGS. 11-15 depict sequences of plies for skins in illustrative embodiments.

FIG. 11 depicts a sequence 1100 of plies for a first skin 210 in an illustrative embodiment. The thickness of the first skin 210 increases from left to right as additional plies are integrated. Specifically, the sequence 1100 dictates the number and fiber orientation of plies 1130 of fiber reinforced material 1140 (e.g., CFRP) that each are made from unidirectional tows arranged at a desired fiber angle. In this embodiment, the angles include ninety degrees (as shown in fiber orientation 1132), zero degrees (as shown in fiber orientation 1134), plus forty-five degrees (as shown in fiber orientation 1136), and minus forty-five degrees (as shown in fiber orientation 1132). Design constraints may apply certain requirements to a sequence 1100. For example, design constraints may require that the fiber orientations along the entirety of the thickness 1122 of the sequence 1100 be symmetrical (e.g., with respect to centerline 1120). This presents a difficulty because first skin 210 will have a lip 414 machined out of it, and the lip will have a different thickness than the rest of the first skin 210.

To address this difficulty, the sequence 1100 exhibits "double symmetry," wherein a region 1112 corresponding with the lip 414 exhibits symmetry in fiber orientations about its centerline 1110, while the entirety of the thickness 1122 of the ply sequence 1100, corresponding with a combined thickness of the lip 414 and a shoulder 416, also exhibits symmetry, but with respect to centerline 1120. This enables a first skin 210 to comply with design requirements pertaining to symmetry of fiber orientations across a centerline, even when a lip 414 is machined from the first skin 210.

Figure 12:
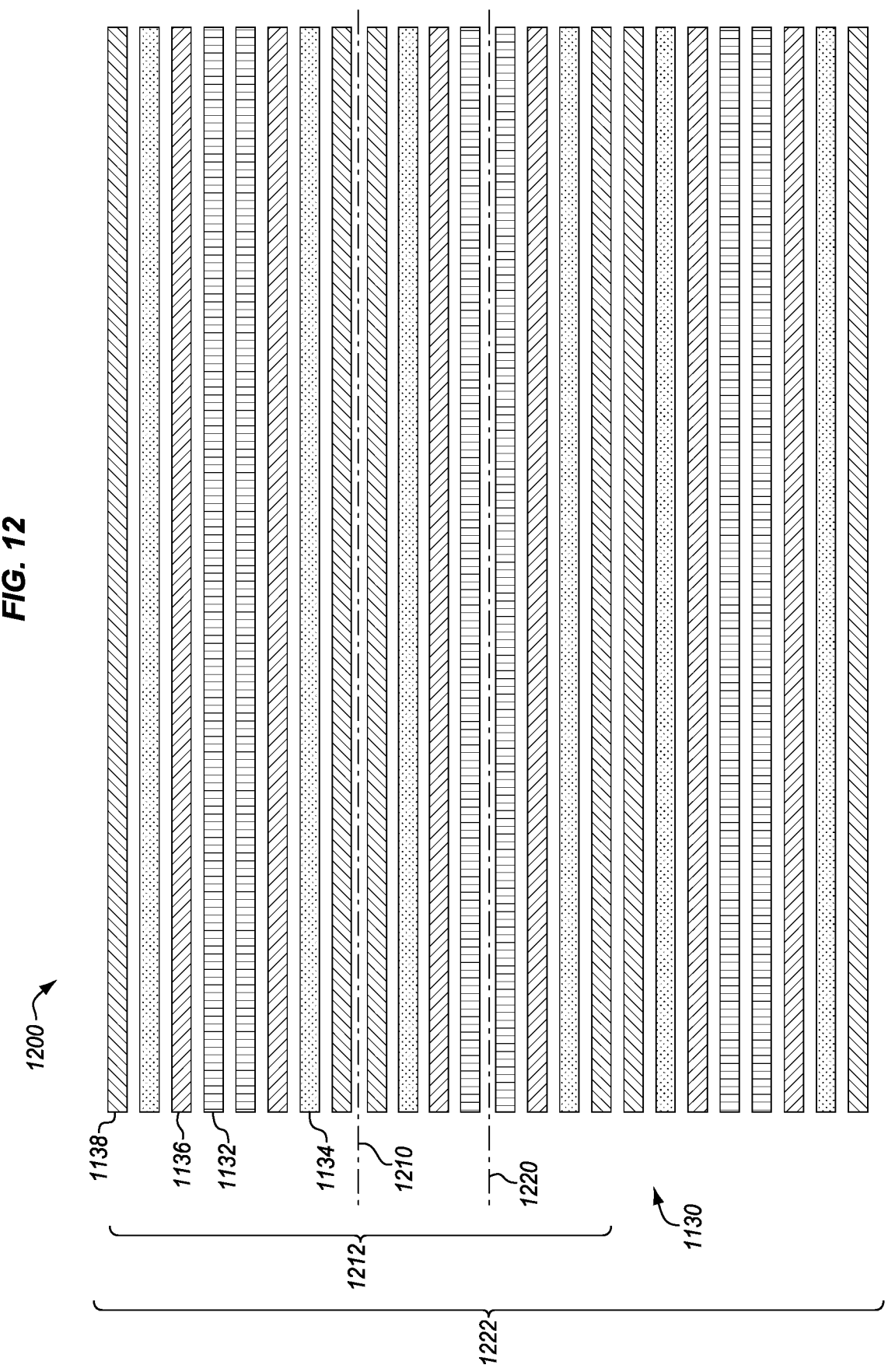

FIGS. 12-15 depict further sequences that are "double symmetric" arrangements of plies. In FIGS. 12-15, a uniform ply length has been provided for each ply. However, similar ramping techniques to those provided in FIG. 11 may be utilized in order to increase the thickness of a first skin 210 from left to right. In FIG. 12, sequence 1200 arranges plies 1130 having fiber orientations 1132, 1134, 1136, and 1138 to form a region 1212 corresponding with a lip 414. The region 1212 is a portion that is left after machining off a portion (e.g., a third) of a thickness 1222 of the sequence 1200. Region 1212 is symmetrical about centerline 1210, and a thickness 1222 of the sequence 1200 is symmetrical about centerline 1220.

Figure 13:
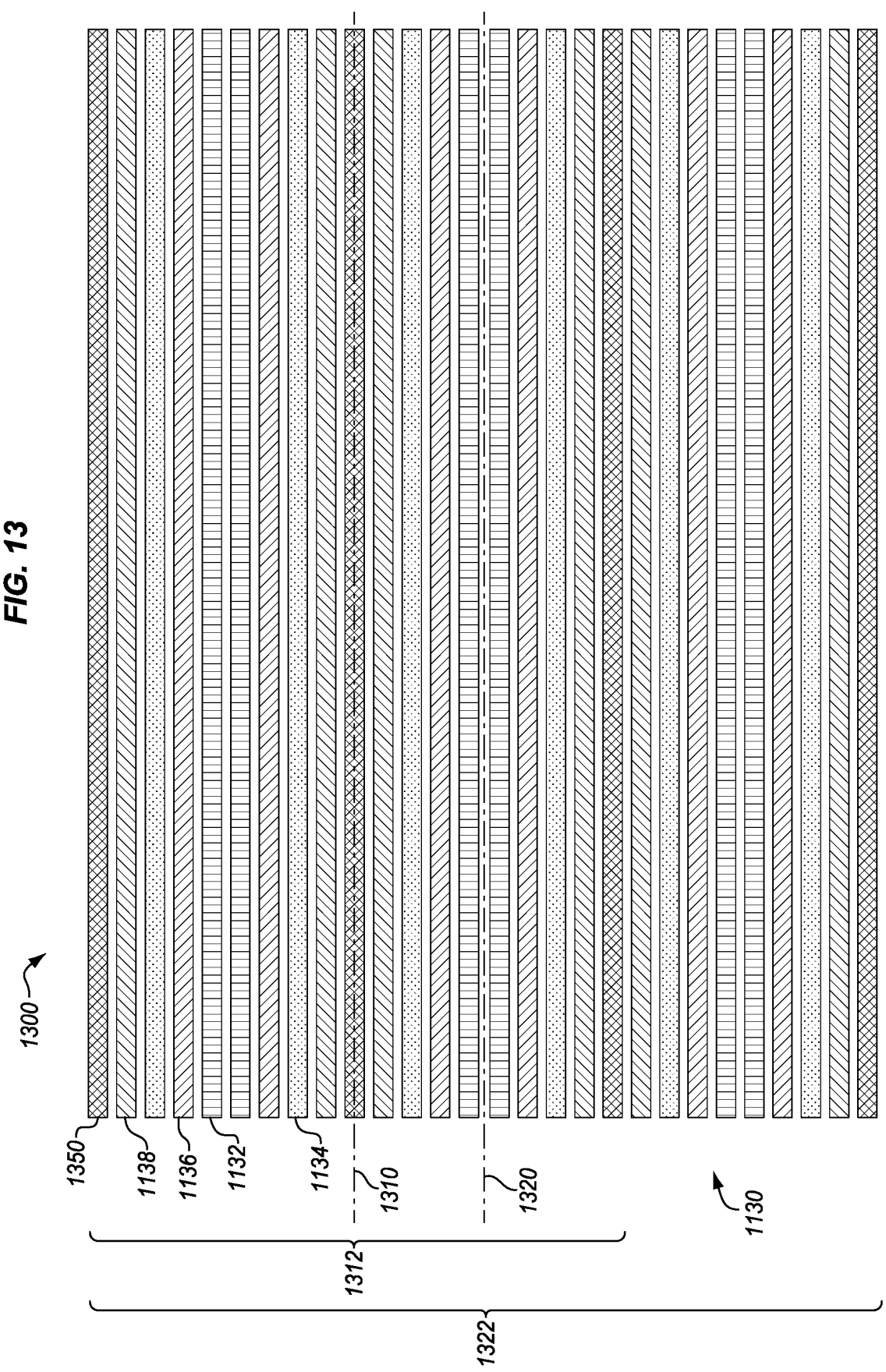

In FIG. 13, additional plies 1350 of woven fabric have been integrated into a sequence 1300. Sequence 1200 arranges plies 1130 having fiber orientations 1132, 1134, 1136, 1138, and 1140 to form a region 1312 corresponding with a lip 414. The region 1312 is a portion that is left after machining off a portion (e.g., one half, one third, two thirds, or any fraction) of a thickness 1322 of the sequence 1300. Region 1312 is symmetrical about centerline 1310, and a thickness 1322 of the sequence 1300 is symmetrical about centerline 1320.

Figure 14:
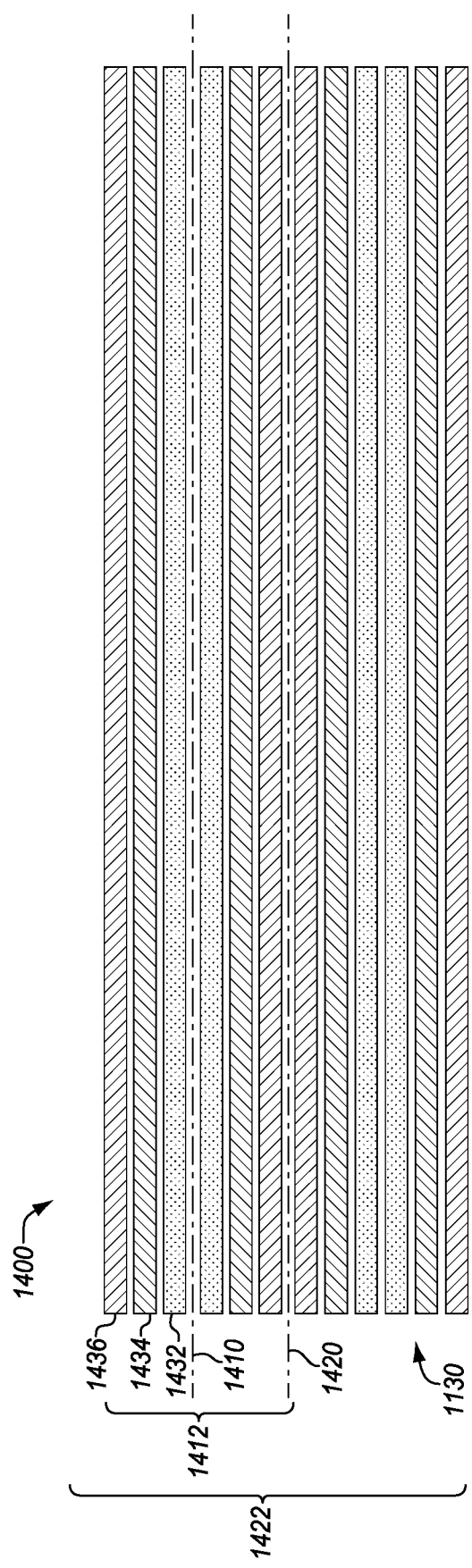

In FIG. 14, a sequence 1400 of plies 1130 is provided having fiber orientations of zero degrees (e.g., fiber orientation 1432), sixty degrees (e.g., fiber orientation 1434), and negative sixty degrees (e.g., fiber orientation 1436). The sequence 1400 exhibits double symmetry. Specifically, region 1412 is symmetrical about centerline 1410, and a thickness 1422 of sequence 1400 is symmetrical about centerline 1420.

Figure 15:
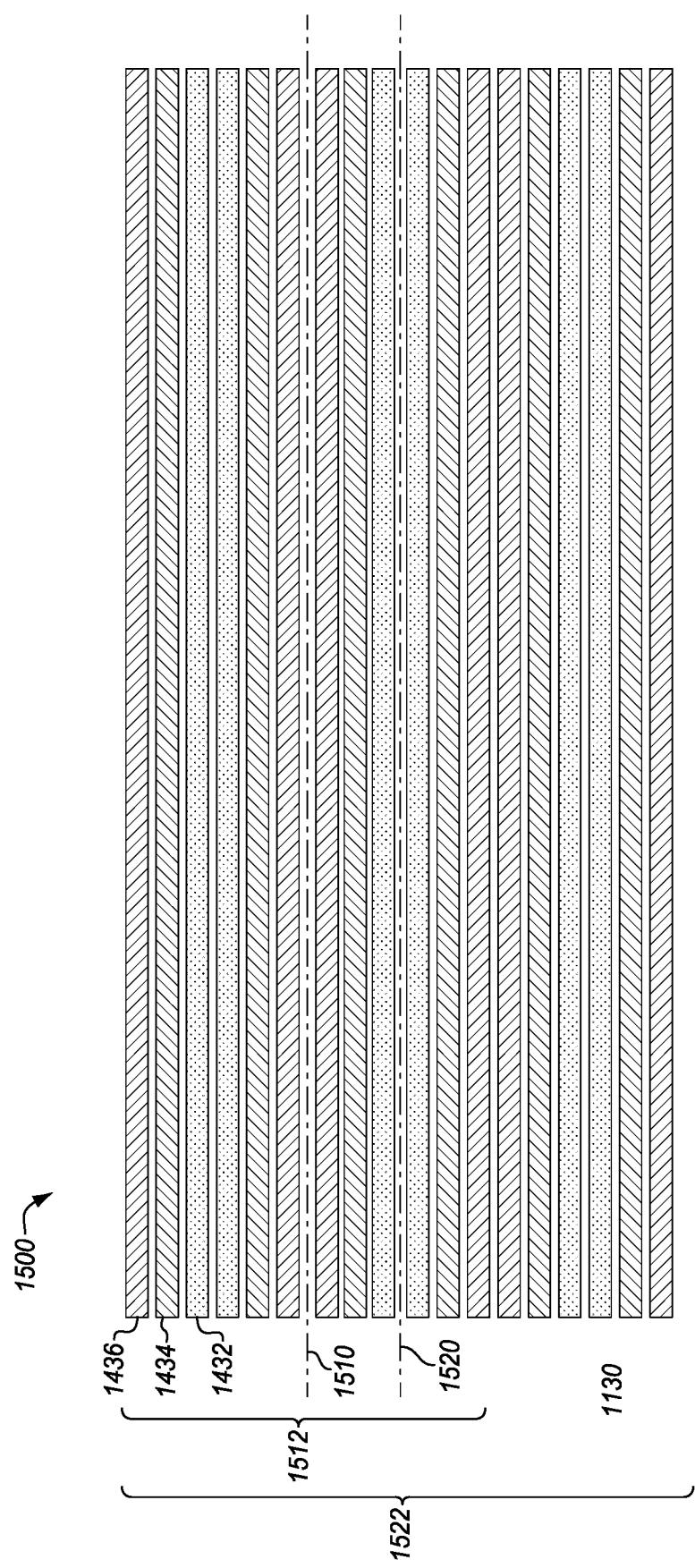

In FIG. 15, a further sequence 1500 of plies 1130 is provided having fiber orientations of zero degrees (e.g., fiber orientation 1432), sixty degrees (e.g., fiber orientation 1434), and negative sixty degrees (e.g., fiber orientation 1436). The sequence 1500 exhibits double symmetry. Specifically, region 1512 is symmetrical about centerline 1510, and a thickness 1522 of sequence 1500 is symmetrical about centerline 1520. Illustrative details of the formation of a circumferential splice 390 will be discussed with regard to FIG. 16. Assume, for this embodiment, that first circumferential section 200 and second circumferential section 300 await joining together.

Figure 16:
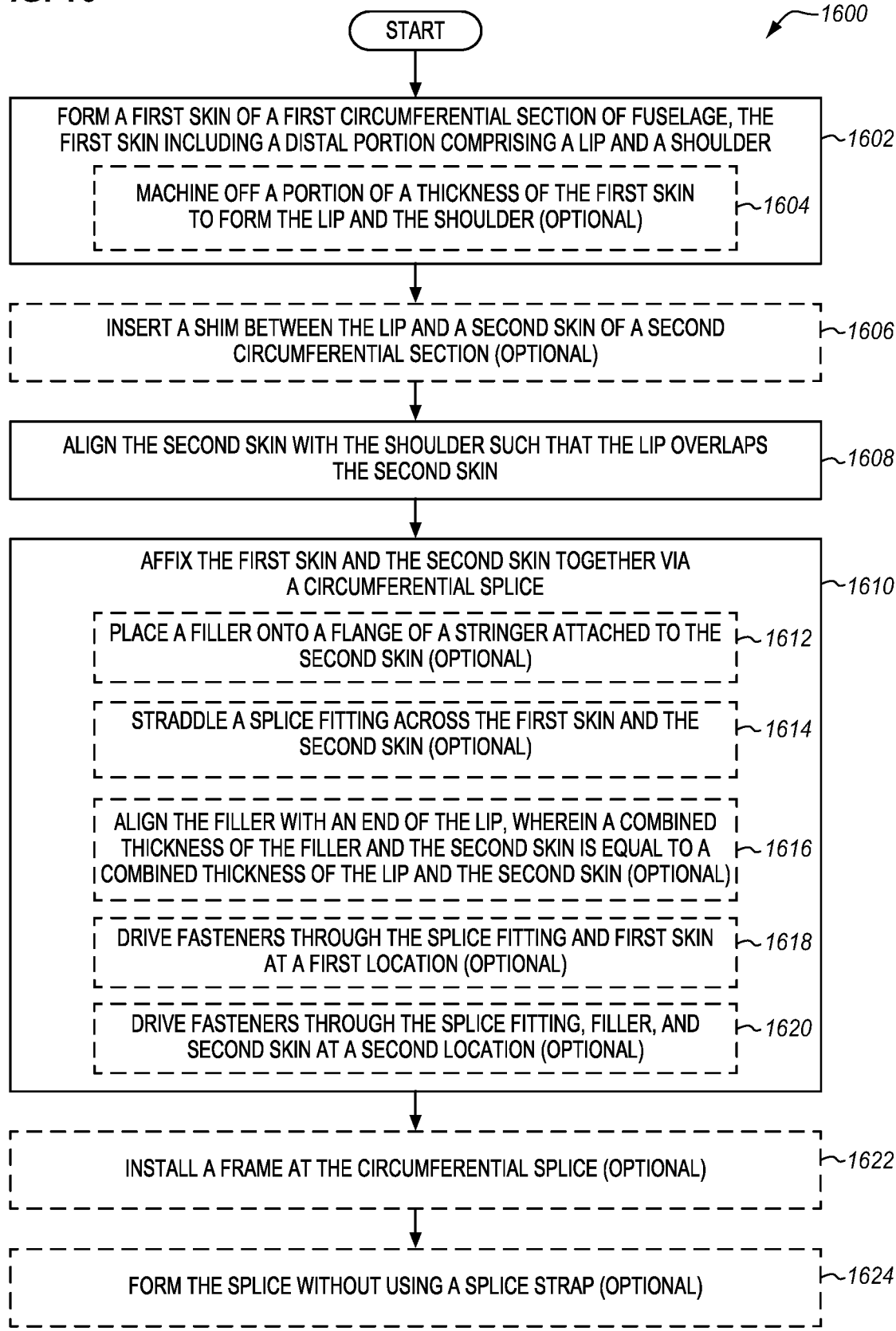
FIG. 16 is a flowchart illustrating a method for forming a circumferential splice in an illustrative embodiment.

FIG. 16 is a flowchart illustrating a method 1600 for forming a circumferential splice 390 in an illustrative embodiment. The steps of method 1600 are described with reference to the components discussed in the FIGS. above, but those skilled in the art will appreciate that method 1600 may be performed in other systems. The steps of the flowcharts described herein are not all inclusive and may include other steps not shown. The steps described herein may also be performed in an alternative order.

In step 1602, a first skin 210 of a first circumferential section 200 of fuselage 28 is formed. The first skin 210 includes a distal portion 420 comprising a lip 414 and a shoulder 416. In optional step 1604, a portion of a thickness of the first skin 210 is machined off to form the lip 414 and the shoulder 416. Such an operation may be performed via a mill, cutter, or other suitable machinery, such as machining tool 1790 of FIG. 17.

Step 1606 comprises optionally inserting a shim 510 between the lip 414 and a second skin 310 of the second circumferential section 300 of fuselage 28.

Step 1608 comprises aligning the second skin 310 of the second circumferential section 300 with the shoulder 416 such that the second skin 310 overlaps the lip 414. This operation is performed circumferentially along the entirety of the second circumferential section 300. The result is a lap join 350 (e.g., a shiplap join, rabbet join, etc.), wherein the second skin 310 is nested against the lip 414 and the shoulder 416 of the first skin 210. Hence, although the second skin 310 is butted against the first skin 210 or otherwise aligned therewith, the end result is not a butt joint.

Step 1610 includes affixing the first skin 210 and the second skin 310 together via a circumferential splice 390. In one embodiment, step 1610 comprises aligning fillers 430, splice fittings 440, lowboys 460, and/or shear tie splices 470, and affixing these components via fasteners, co-curing, or co-bonding. Step 1612 comprises optionally placing a filler 430 onto a flange 322 of a stringer 320 that is attached to the second skin 310.

Step 1614 comprises optionally straddling the splice fitting 440 across the first skin 210 and the second skin 310. In one embodiment, this comprises placing second portion 1040 of the base 442 of the splice fitting 440 onto the flange 222 of the stringer 220 at the first skin 210, and then sliding the filler 430 between the first portion 1030 of the base 442 of the splice fitting 440 and the flange 322 of the stringer 320.

Step 1616 comprises optionally aligning the filler 430 with an end 520 of the lip 414, such that a combined thickness of the filler 430 and the flange 322 of the stringer 320 at the second circumferential section 300 of fuselage 28 is equal to a combined thickness of the lip 414, a shim 510 that contacts the lip 414, and a flange 222 of a stringer 220 at the first circumferential section 200. In one embodiment, this comprises sliding the filler 430 underneath the splice fitting 440 and atop the flange 322, such that the filler 430 is sandwiched between the splice fitting 440 and the flange 322.

Step 1618 comprises optionally driving fasteners 450 through the first skin 210, flange 222, and/or splice fitting 440 at a location 496. Step 1620 comprise optionally driving fasteners 450 through the second skin 310, flange 322, filler 430, and/or splice fitting 440 at a location 492.

With the circumferential splice 390 completed, additional structure may be attached. For example, step 1622 comprises optionally installing a frame 480 at the circumferential splice 390. In further embodiments, the frame 480 is installed as a part of step 1610.

Step 1624 comprises optionally forming the circumferential splice 390 without using a splice strap (i.e., foregoing/omitting installation of a splice strap). Although not illustrated, a splice strap is a structural component of a splice that overlaps two butted (or otherwise aligned) skins, forming a single strap joint. The circumferential splices 390 discussed herein forego the need for a splice strap, because lip 414 provides the structural purpose of strengthening that would be performed by a splice strap.

Method 1600 provides a technical benefit by providing a strengthened join between sections of fuselage 28 with respect to prior systems that utilized a splice strap to form a single strap joint. Furthermore, method 1600 reduces the amount of labor involved in aligning components of a circumferential splice 390 (because there is no need to align with a splice strap), and reduces weight (because the splice strap is eliminated). This results in benefits pertaining to assembly, as well as to reduced fuel consumption costs.

Examples

In the following examples, additional processes, systems, and methods are described in the context of a circumferential splice 390 for circumferential sections of fuselage in an illustrative embodiment.

Figure 17:
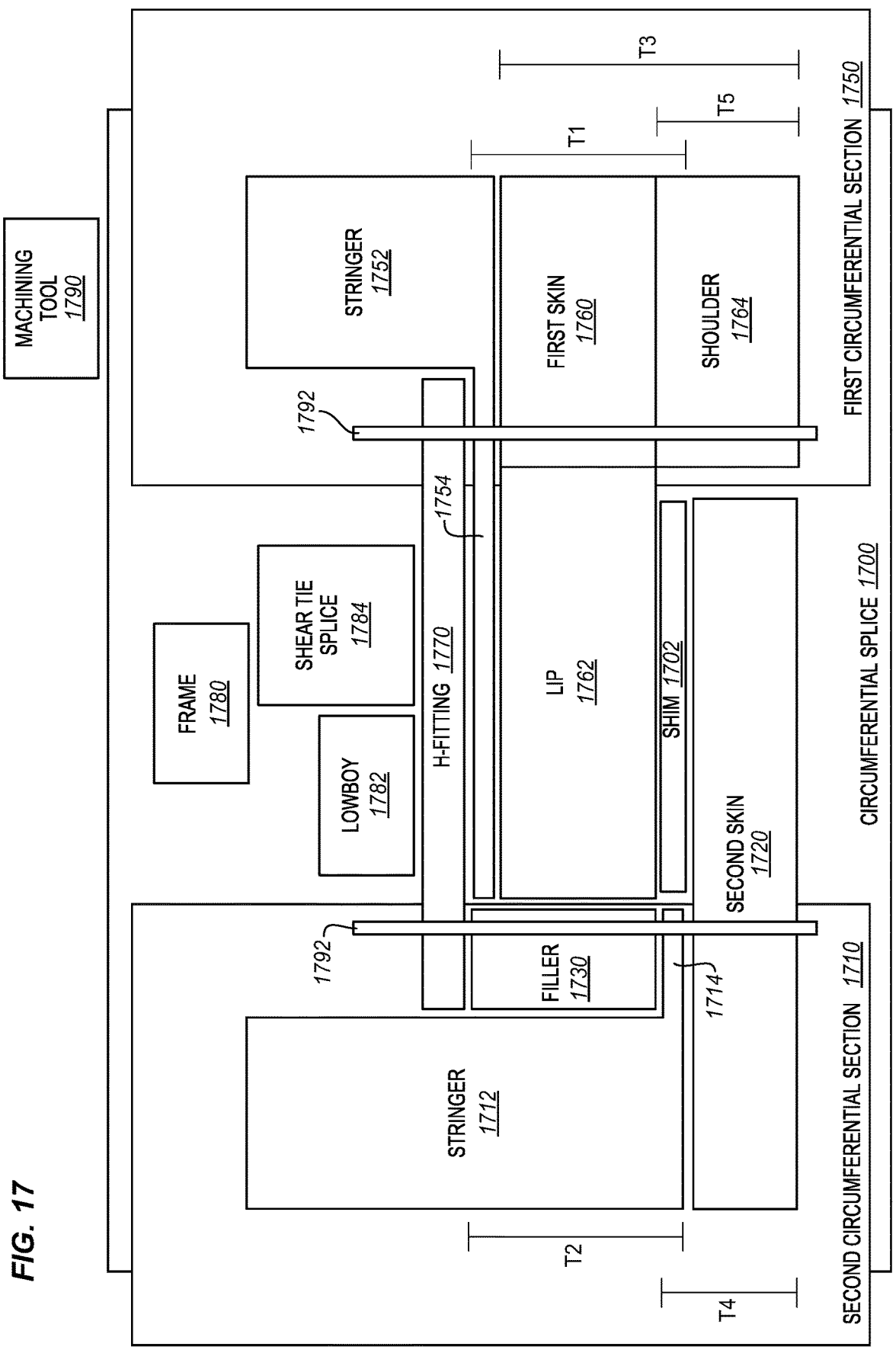
FIG. 17 is a block diagram of a circumferential splice in an illustrative embodiment.

FIG. 17 is a block diagram of a circumferential splice 1700 between a first circumferential section 1750 and a second circumferential section 1710 of fuselage 28 in an illustrative embodiment. In this embodiment, first circumferential section 1750 includes a first skin 1760 having a lip 1762 and a shoulder 1764, and further includes a stringer 1752 having a flange 1754. Second circumferential section 1710 includes second skin 1720 that is aligned with (e.g., butted against or nested at) shoulder 1764, and further includes a stringer 1712 having a flange 1714. A filler 1730 rests atop the flange 1714, and a splice fitting 1770 rests atop filler 1730 and flange 1754 of stringer 1752. Fasteners 1792 affix the splice fitting 1770 in place. Lowboy 1782 is attached to splice fitting 1770, as is shear tie splice 1784. A frame 1780 is attached to the shear tie splice 1784. Furthermore, a shim 1702 is disposed between the lip 1762 and the second skin 1720. FIG. 17 further depicts a machining tool 1790 for machining the lip 1762 from a thickness (T3) the first skin 1760. The machining tool 1790 may comprise, for example, a mill, a circular or reciprocating saw, or other tool.

FIG. 17 further illustrates that a combined thickness (T2) of the filler 1730 and a flange 1714 of the stringer 1712 at the second circumferential section 1710 of fuselage 28 is equal to a combined thickness (T1) of the lip 1762, a shim 1702 contacting the lip 1762, and a flange 1754 of a stringer 1752 at the first circumferential sectional 1750. Furthermore, a thickness (T4) of the second skin 1720 and a shim 1702 equals a thickness (T5) of the shoulder 1764.

Figure 18:
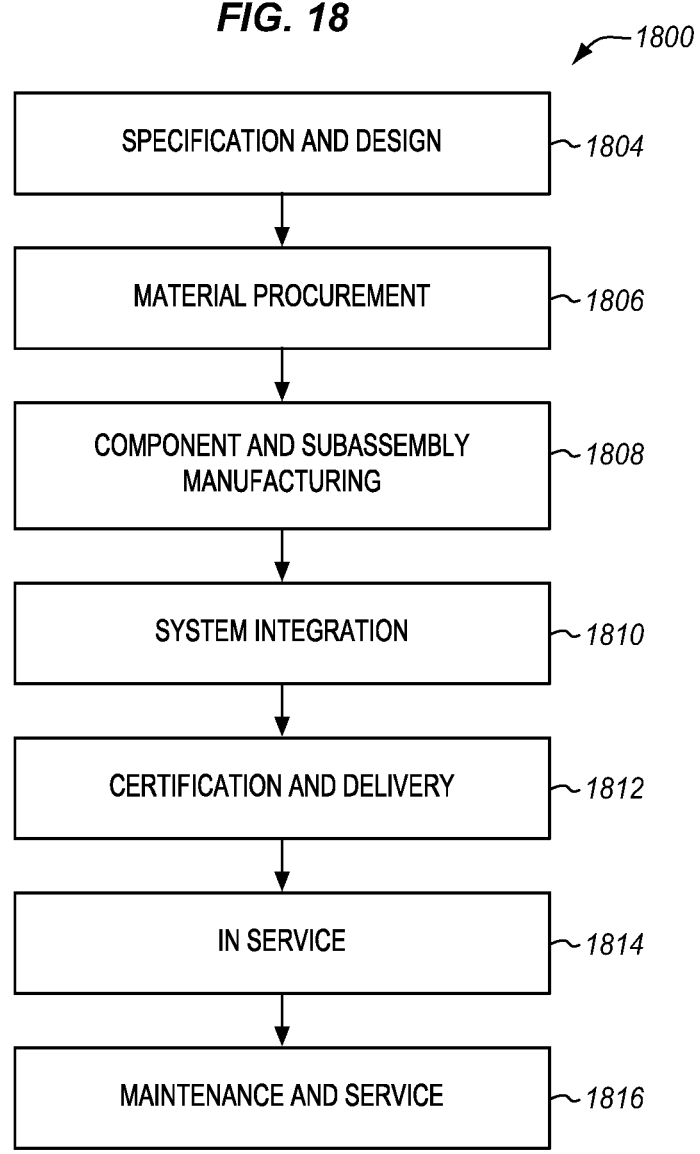
FIG. 18 is a flow diagram of aircraft production and service methodology in an illustrative embodiment.
Figure 19:
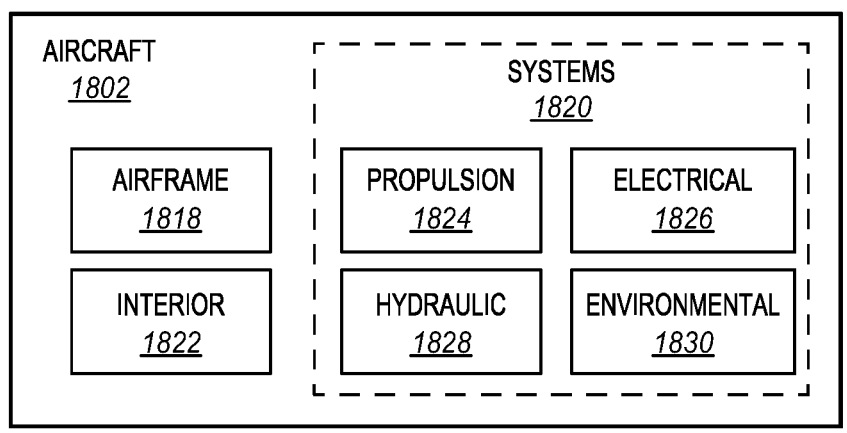
FIG. 19 is a block diagram of an aircraft in an illustrative embodiment.

Referring more particularly to the drawings, embodiments of the disclosure may be described in the context of aircraft manufacturing and service in method 1800 as shown in FIG. 18 and an aircraft 1802 as shown in FIG. 19. During pre-production, method 1800 may include specification and design 1804 of the aircraft 1802 and material procurement 1806. During production, component and subassembly manufacturing 1808 and system integration 1810 of the aircraft 1802 takes place. Thereafter, the aircraft 1802 may go through certification and delivery 1812 in order to be placed in service 1814. While in service by a customer, the aircraft 1802 is scheduled for routine work in maintenance and service 1816 (which may also include modification, reconfiguration, refurbishment, and so on). Apparatus and methods embodied herein may be employed during any one or more suitable stages of the production and service described in method 1800 (e.g., specification and design 1804, material procurement 1806, component and subassembly manufacturing 1808, system integration 1810, certification and delivery 1812, service 1814, maintenance and service 1816) and/or any suitable component of aircraft 1802 (e.g., airframe 1818, systems 1820, interior 1822, propulsion system 1824, electrical system 1826, hydraulic system 1828, environmental system 1830).

Each of the processes of method 1800 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 19, the aircraft 1802 produced by method 1800 may include an airframe 1818 with a plurality of systems 1820 and an interior 1822. Examples of systems 1820 include one or more of a propulsion system 1824, an electrical system 1826, a hydraulic system 1828, and an environmental system 1830. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 1800. For example, components or subassemblies corresponding to component and subassembly manufacturing 1808 may be fabricated or manufactured in a manner similar to components or subassemblies produced while the aircraft 1802 is in service. Also, one or more apparatus embodiments, method embodiments, or a combination thereof may be utilized during the subassembly manufacturing 1808 and system integration 1810, for example, by substantially expediting assembly of or reducing the cost of an aircraft 1802. Similarly, one or more of apparatus embodiments, method embodiments, or a combination thereof may be utilized while the aircraft 1802 is in service, for example and without limitation during the maintenance and service 1816. Thus, the invention may be used in any stages discussed herein, or any combination thereof, such as specification and design 1804, material procurement 1806, component and subassembly manufacturing 1808, system integration 1810, certification and delivery 1812, service 1814, maintenance and service 1816 and/or any suitable component of aircraft 1802 (e.g., airframe 1818, systems 1820, interior 1822, propulsion system 1824, electrical system 1826, hydraulic system 1828, and/or environmental system 1830).

In one embodiment, a part comprises a portion of airframe 1818, and is manufactured during component and subassembly manufacturing 1808. The part may then be assembled into an aircraft in system integration 1810, and then be utilized in service 1814 until wear renders the part unusable. Then, in maintenance and service 1816, the part may be discarded and replaced with a newly manufactured part. Inventive components and methods may be utilized throughout component and subassembly manufacturing 1808 in order to manufacture new parts.

Although specific embodiments are described herein, the scope of the disclosure is not limited to those specific embodiments. The scope of the disclosure is defined by the following claims and any equivalents thereof.

What is claimed is:

1. A method for assembling an airframe of an aircraft, the method comprising:
    forming a first skin of a first circumferential section of fuselage comprising the first skin and first stringers, wherein the first skin includes a distal portion comprising a lip and a shoulder;
    aligning a second skin of a second circumferential section of fuselage with the shoulder such that the second skin overlaps the lip of the first skin to form a lap join, wherein the second circumferential section comprises the second skin and second stringers; and
    affixing the first skin and the second skin together via a circumferential splice by:
        placing a filler onto flanges of the second stringers;
        aligning the filler with an end of the lip such that a combined thickness of the filler and a flange of a second stringer is equal to a combined thickness of the lip and a flange of a first stringer to form a flat plane;
        straddling splice fittings across the lap join between the first stringers and the second stringers on the flat plane;
        driving fasteners through the first skin, flanges of the first stringers, and the splice fittings; and
        driving fasteners through the second skin, the flanges of the second stringers, the filler, and the splice fittings.

2. The method of claim 1 wherein:
    forming the first skin comprises machining off a portion of a thickness of the first skin to form the lip and the shoulder.

3. The method of claim 1 further comprising:
    inserting a shim between the lip and the second skin.

4. The method of claim 1 wherein:
    the second skin increases in thickness toward a section where the second skin overlaps the lip.

5. The method of claim 1 further comprising:
    installing a frame at the circumferential splice.

6. A system comprising a portion of an airframe of an aircraft, the system comprising:
    a first circumferential section of fuselage comprising a first skin and first stringers, wherein the first skin includes a distal portion comprising a lip and a shoulder;
    a second circumferential section of fuselage comprising a second skin and second stringers; and
    a circumferential splice that affixes the first circumferential section to the second circumferential section;

wherein the circumferential splice comprises:
- a lap join where the second skin overlaps the lip of the first skin;
- a filler placed on flanges of the second stringers and aligned with an end of the lip such that a combined thickness of the filler and a flange of a second stringer is equal to a combined thickness of the lip and a flange of a first stringer to form a flat plane;
- splice fittings straddled across the lap join between the first stringers and the second stringers on the flat plane;
- fasteners driven through the first skin, flanges of the first stringers, and the splice fittings; and
- fasteners driven through the second skin, the flanges of the second stringers, the filler, and the splice fittings.

7. The system of claim 6 wherein:
fiber orientations of plies of fiber reinforced material in the first skin are symmetrical about a centerline of the first skin; and
fiber orientations of plies of fiber reinforced material in the lip are symmetrical about a centerline of the lip.

8. The system of claim 6 wherein:
the filler is butted against an end of the lip.

9. The system of claim 6 wherein:
the flanges of the first stringers extend beyond a body of the first stringers and across the lap join along the lip.

10. The system of claim 6 wherein:
the splice fittings are asymmetrical from fore to aft.

11. The system of claim 6 further comprising:
a shim disposed between the lip and the second skin.

12. The system of claim 6 wherein:
the second skin increases in thickness toward a section where the second skin overlaps the lip.

13. The system of claim 6 wherein:
the flanges of the first stringers extend along the lip towards the second skin.

14. The system of claim 12 wherein:
a thickness of the first skin at the circumferential splice is greater than the thickness of the second skin at the circumferential splice.

15. The system of claim 6 wherein:
the first circumferential section of fuselage comprises a barrel section; and
the second circumferential section of fuselage comprises a barrel section.

16. The system of claim 6 wherein:
a thickness of the second skin and a shim equals a thickness of the shoulder.

17. An aircraft comprising:
a first circumferential section comprising a first skin and first stringers;
a second circumferential section comprising a second skin and second stringers; and
a circumferential splice that affixes the first circumferential section to the second circumferential section;
wherein the first skin includes a lip and a shoulder, and the second skin forms a lap join with the first skin by overlapping the lip of the first skin;
wherein the circumferential splice comprises:
- a filler placed on flanges of the second stringers and aligned with an end of the lip such that a combined thickness of the filler and a flange of a second stringer is equal to a combined thickness of the lip and a flange of a first stringer to form a flat plane;
- splice fittings straddled across the lap join between the first stringers and the second stringers on the flat plane;
- fasteners driven through the first skin, flanges of the first stringers, and the splice fittings; and
- fasteners driven through the second skin, the flanges of the second stringers, the filler, and the splice fittings.

18. The aircraft of claim 17 wherein the circumferential splice further comprises:
a shim disposed between the lip and the second skin.

19. The aircraft of claim 17 wherein:
the second skin increases in thickness toward a section where the second skin overlaps the lip.

20. The aircraft of claim 19 wherein:
a thickness of the first skin at the circumferential splice is greater than the thickness of the second skin at the circumferential splice.

\* \* \* \* \*